United States Patent
Tun et al.

(10) Patent No.: US 8,374,787 B2
(45) Date of Patent: Feb. 12, 2013

(54) MOBILE NAVIGATION DEVICE

(75) Inventors: Yun-Long Tun, Taoyuan County (TW); Hsing-Chiang Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 12/970,273

(22) Filed: Dec. 16, 2010

(65) Prior Publication Data

US 2011/0208430 A1   Aug. 25, 2011

(30) Foreign Application Priority Data

Feb. 23, 2010 (TW) ................................ 99105132 A

(51) Int. Cl.
*G01C 21/00* (2006.01)
(52) U.S. Cl. ..................................... 701/472; 342/357.3
(58) Field of Classification Search .................. 701/216, 701/472, 200, 400
See application file for complete search history.

(56) References Cited

U.S. PATENT DOCUMENTS

| | | | |
|---|---|---|---|
| 6,859,725 B2 * | 2/2005 | Challoner et al. | 701/472 |
| 7,373,261 B2 * | 5/2008 | Heidl et al. | 702/45 |
| 7,788,025 B2 * | 8/2010 | McLaren et al. | 701/472 |
| 2003/0236619 A1 | 12/2003 | Dorian et al. | |
| 2006/0284765 A1 * | 12/2006 | Bernhardt et al. | 342/357.09 |
| 2008/0262728 A1 | 10/2008 | Lokshin et al. | |
| 2009/0143980 A1 * | 6/2009 | Halters et al. | 701/209 |
| 2010/0138147 A1 * | 6/2010 | T'Siobbel | 701/201 |
| 2010/0176992 A1 * | 7/2010 | T'siobbel | 342/357.25 |
| 2010/0265126 A1 * | 10/2010 | Mao | 342/357.3 |

FOREIGN PATENT DOCUMENTS

| | | | |
|---|---|---|---|
| CN | 101382431 A | | 3/2009 |
| WO | WO 2008/143497 A1 | | 11/2008 |
| WO | WO 2008143497 A1 * | | 11/2008 |

* cited by examiner

*Primary Examiner* — Behrang Badii
*Assistant Examiner* — Shardul Patel
(74) *Attorney, Agent, or Firm* — Birch, Stewart, Kolasch & Birch, LLP

(57) ABSTRACT

A mobile navigation device operating in a first mode and a second mode is provided. In the first mode, a satellite positioning module is activated while a dead reckoning module is disabled. A processor calculates the coordinates of the mobile navigation device based on the satellite navigation signals received by the satellite positioning module. In the second mode, the satellite positioning module is disabled while the dead reckoning module is activated, and the processor updates the coordinates based on displacements and rotations detected by the dead reckoning module.

16 Claims, 8 Drawing Sheets

US 8,374,787 B2

MOBILE NAVIGATION DEVICE

CROSS REFERENCE TO RELATED APPLICATIONS

This Application claims priority of Taiwan Patent Application No. 099105132, filed on Feb. 23, 2010, the entirety of which is incorporated by reference herein.

BACKGROUND OF THE INVENTION

1. Field of the Invention

The invention relates to a mobile navigation device, and more particularly to a navigation orientation method using a dead reckoning (DR) procedure and a global positioning system (GPS) for a mobile navigation device.

2. Description of the Related Art

Geographical positioning technologies, such as a GPS system, use satellites and are of common technological architectures. Following the advancement of GPS receivers, mobile navigation devices have been widely applied commercially. For example, a GPS receiver and a navigation software may be integrated into a mobile phone, a personal digital assistant (PDA) or a automotive computer to create a mobile navigation device.

However, for mobile devices, while power consumption for a GPS receiver therein has been decreased, the ability to further decrease power consumption is at a technical bottleneck. During the navigation process, the GPS receiver must always be enabled for continuous tracking of navigation signals from satellites.

Therefore, a navigation orientation technology is desired which uses a GPS receiver effectively and reduces power consumption.

BRIEF SUMMARY OF THE INVENTION

A mobile navigation device is provided. An exemplary embodiment of a mobile navigation device comprises a satellite positioning module for receiving a satellite navigation signal, a dead reckoning module for detecting a displacement and a rotation of the mobile navigation device, and a processor coupled to the satellite positioning module and the dead reckoning module. The mobile navigation device operates in a first mode and a second mode alternately. In the first mode, the satellite positioning module is activated and the dead reckoning module is disabled, and the processor calculates a position coordinate according to the satellite navigation signal. In the second mode, the satellite positioning module is disabled and the dead reckoning module is activated, and the processor updates the position coordinate according to the displacement and the rotation.

The mobile navigation device further comprises a firmware for providing a program to control the timing for switching between the first mode and the second mode for the processor, and a memory coupled to the processor for storing the position coordinate.

Furthermore, an orientation method for a mobile navigation device with a satellite positioning module and a dead reckoning module is provided. First, the mobile navigation device operates in a first mode and a second mode alternately. In the first mode, the satellite positioning module is activated to receive a satellite navigation signal, and a position coordinate is calculated according to the satellite navigation signal. In the second mode, the satellite positioning module is disabled to save power, and the dead reckoning module is activated to detect a displacement and a rotation of the mobile navigation device. Finally, the position coordinate is updated according to the displacement and the rotation.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention discloses using dead reckoning (DR) technology with a GPS receiver to implement a new mobile navigation architecture. Dead reckoning technology is a technology which uses motion inertia to detect self-displacement. In general, DR comprises a Gyro or an acceleration sensor (or G-sensor), which can detect acceleration, velocity and motion distance and also change in a traveling direction. Distortion range of detection results of a dead reckoning module (e.g. 120 of FIG. 1) may increase when moving, but the detection results still have reliability during a specific time period or over a distance range. Because power consumption of the dead reckoning module is lower than that of a satellite positioning module (e.g. 110 of FIG. 1), such as below one over ten, the satellite positioning module and the dead reckoning module may be alternatively used according to specific conditions. Thus, accurate navigation orientation and power saving may be achieved. The satellite positioning module and the dead reckoning module will be introduced in the following embodiments.

Figure 1:
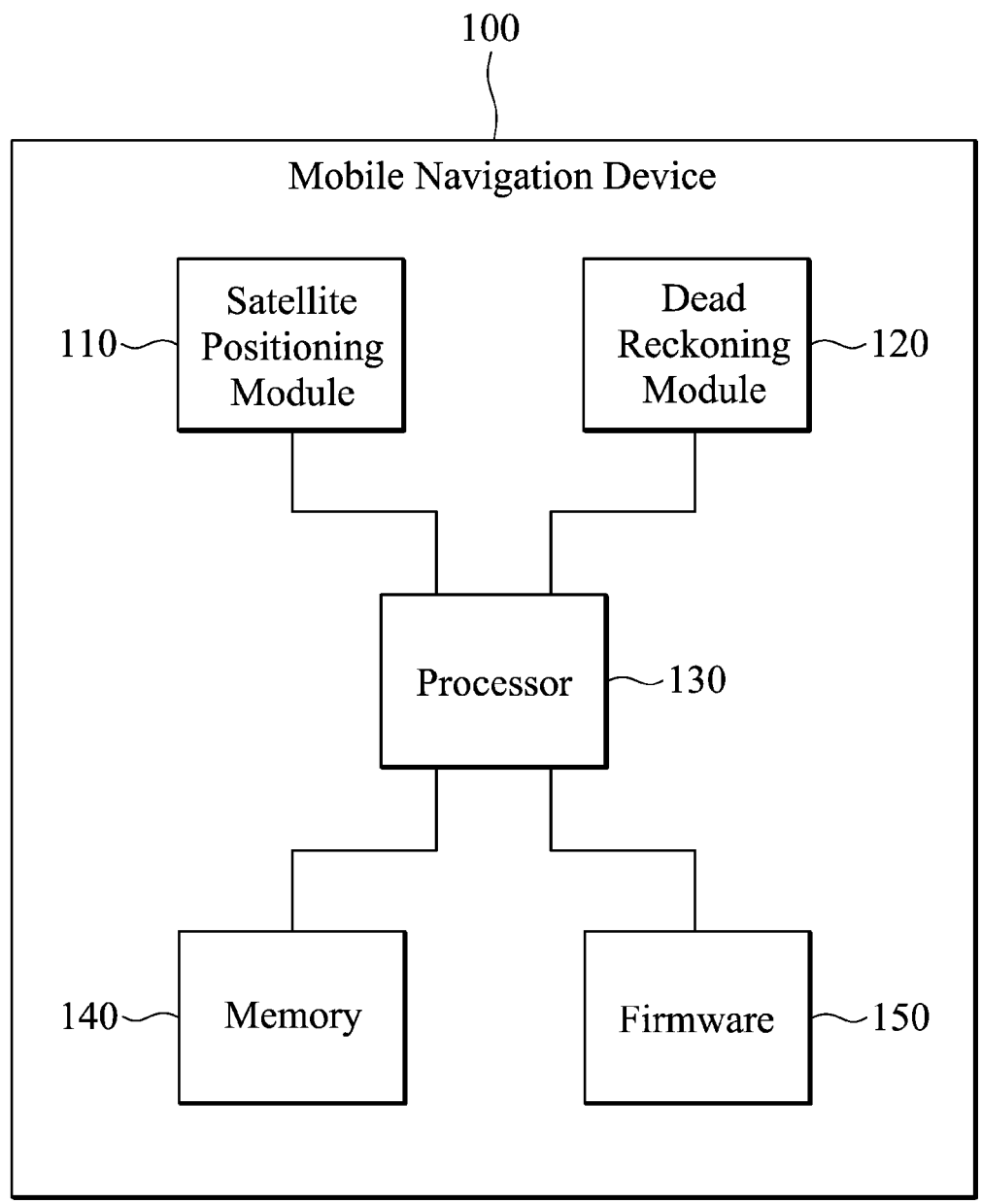
FIG. 1 shows a mobile navigation device according to an embodiment of the invention.

FIG. 1 shows a mobile navigation device 100 according to an embodiment of the invention, which comprises a satellite positioning module 110 and a dead reckoning module 120 that are controlled by a processor 130. The satellite positioning module 110 receives a satellite navigation signal. The dead reckoning module 120 detects a displacement and a rotation of the mobile navigation device 100. The displacement indicates a motion distance during a specific unit of time, and the rotation indicates a variation in traveling direction. Therefore, a traveling path of the mobile navigation device 100 can be restored by recording the displacement and the rotation. The processor 130 may perform a program which is stored in a firmware 150, and which is pre-designed to control the satellite positioning module 110 and the dead reckoning module 120. For example, the mobile navigation device 100 of the embodiment is designed to operate in two modes, i.e. a first mode and a second mode. In the first mode, the satellite positioning module 110 is activated while the dead reckoning module 120 is disabled, and the processor 130 calculates a position coordinate according to the satellite navigation signal. In the second mode, the satellite positioning module 110 is disabled while the dead reckoning module 120 is activated, and the processor 130 updates the position coordinate according to the displacement and the rotation. In brief, the first mode is also called a GPS mode and the second mode is also called a DR mode.

A memory 140 is used to store any data that is used for operations, and more particularly to the position coordinates of the mobile navigation device 100 which may be invariably moved. Meanwhile, for the mobile navigation device 100, a great quantity of data is needed to be accumulated for tracing and locking into the satellite navigation signals, which may take a long period of time to accumulate. For example, distribution of satellites, also called Ephemeris, is necessary for locking into the position coordinates. Therefore, the information may be stored in the memory 140 temporarily when the satellite positioning module 110 is disabled. When the mobile navigation device 100 is switched back to the first mode and the satellite positioning module 110 is activated again, the information stored in the memory 140 can be immediately used; thus reducing time to re-establish the information.

Detailed operation of the mobile navigation device 100 will be described below.

Figure 2:
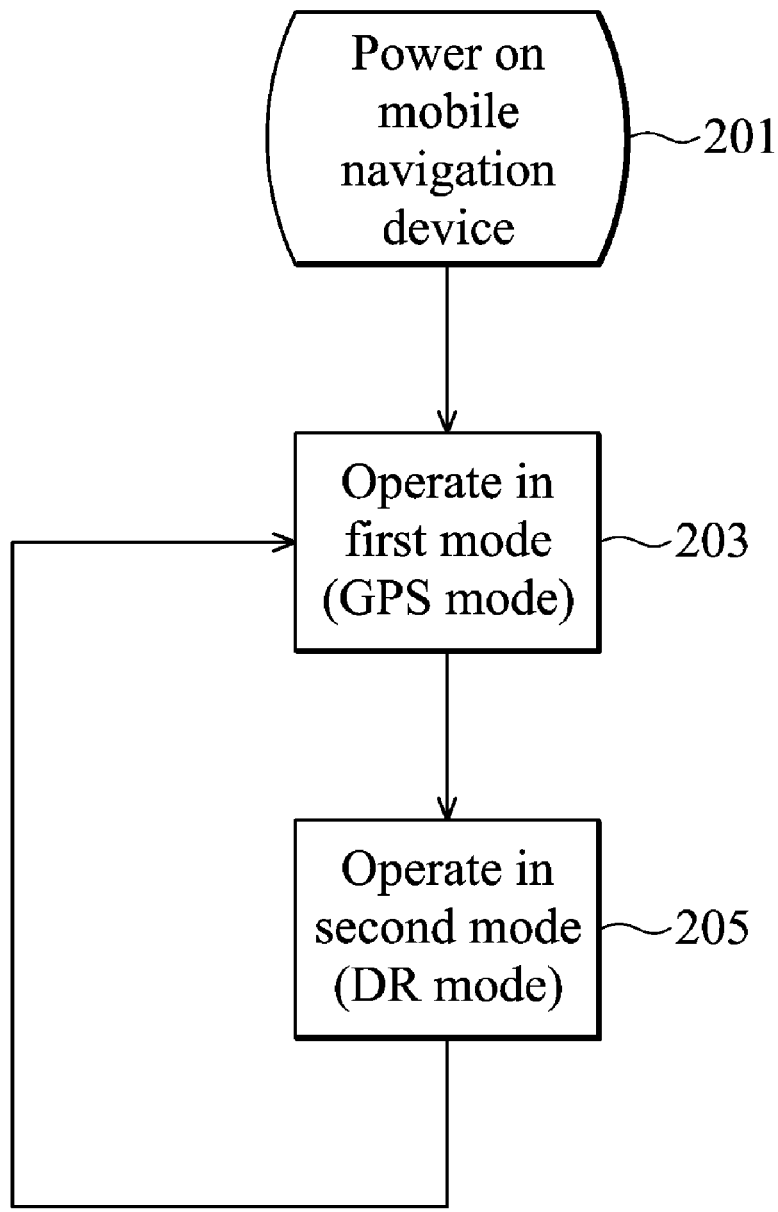
FIG. 2 shows a flowchart illustrating operations of the mobile navigation device according to the embodiment of the invention.

FIG. 2 shows a flowchart illustrating operations of the mobile navigation device 100 according to the embodiment of the invention. First, in step 201, the mobile navigation device 100 is powered on. Next, in step 203, the mobile navigation device 100 enters the first mode and obtains a current position coordinate by using GPS. Next, the mobile navigation device 100 does not need to be continuously kept in the first mode, and then the mobile navigation device 100 may be switched to the second mode, as in step 205, dependant on actual conditions. In the second mode, the satellite positioning module 110 is disabled, so as to reduce power consumption. Furthermore, sequential updates of the position coordinates are dependant on detection of the dead reckoning module 120. Because distortion of the position coordinate may occur in step 205, the mobile navigation device 100 may return back to step 203 according to actual conditions before a range of the distortion magnifies, and then the mobile navigation device 100 may enable the satellite positioning module 110 again to accurately obtain the position coordinate. Therefore, step 203 and step 205 may be performed repeatedly. Power consumption in step 205 is substantially smaller than that in step 203; thus reducing cumulative power consumption, significantly.

Detailed illustration of the embodiments in step 203 and step 205 will be described below.

Figure 3:
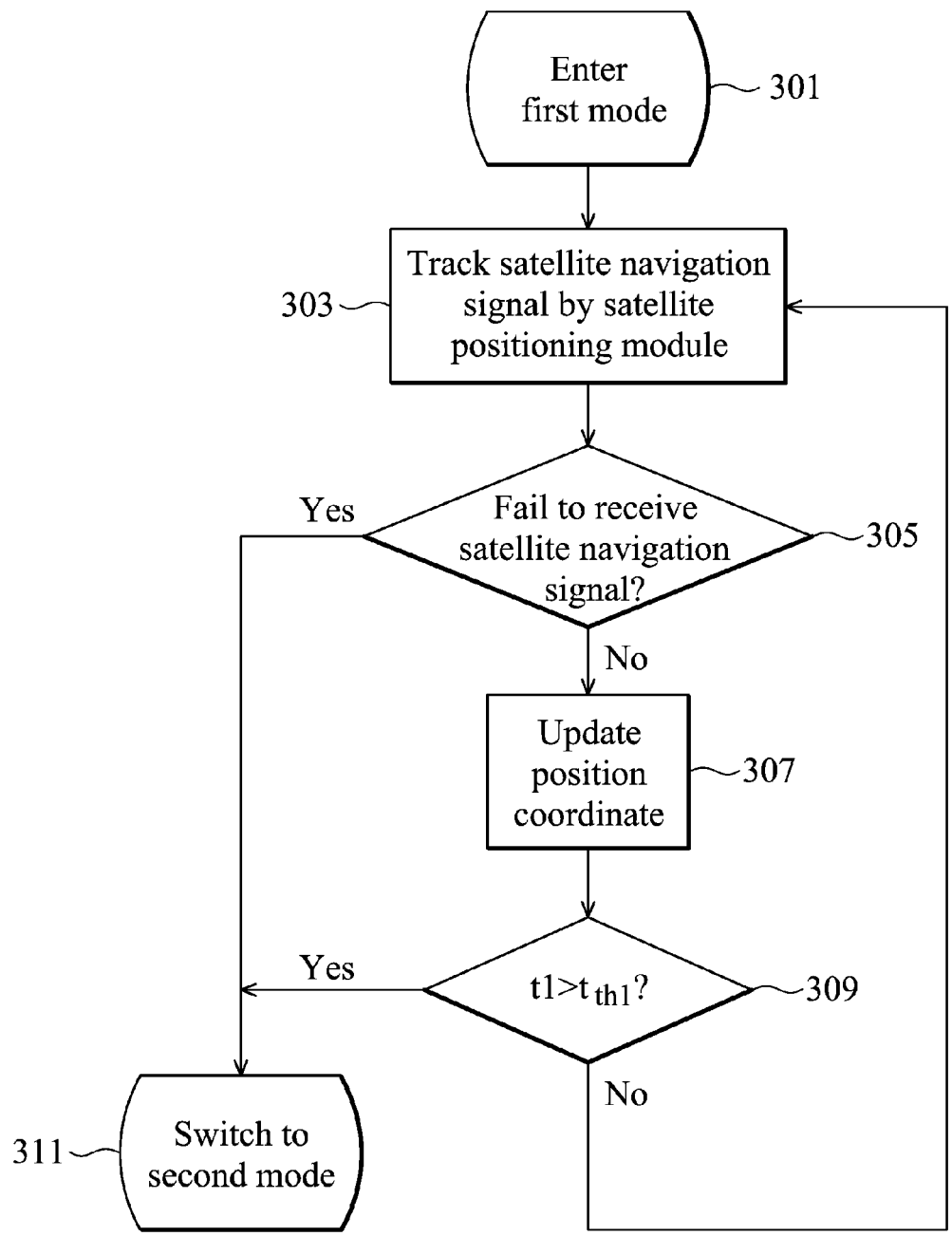
FIG. 3 shows a flowchart illustrating the mobile navigation device operating in a GPS mode.

FIG. 3 shows a flowchart illustrating the mobile navigation device 100 operating in a GPS mode (the first mode). In the embodiment, the receiving status of the satellite navigation signal and a time span indicating a time period for which the mobile navigation device has continuously operated in the mode are the chief switching considerations. First, in step 301, the mobile navigation device 100 enters the first mode. In step 303, the satellite positioning module 110 is activated, and starts to track and lock onto satellite navigation signals. If information regarding the ephemeris has been stored in the memory 140, the information may be used to speed up the tracking and locking process for the position coordinates. In step 305, the satellite positioning module 110 may determine whether the satellite navigation signal satisfies a receiving condition. For example, if the mobile navigation device 100 is situated indoors and can not receive the satellite navigation signal, GPS orientation can not be performed. Alternatively, if the tracking and locking process consumes a long period of time and reaches a time-out limit, it is presumed that the receiving condition has not been satisfied. When the satellite navigation signal does not satisfy the receiving condition, the mobile navigation device 100 is switched to the second mode by the processor 130 (step 311).

On the other hand, in step 305, if the satellite navigation signal satisfies the receiving condition, such as if the mobile navigation device 100 can receive the satellite navigation signal successfully, step 307 will be performed. In step 307, the processor 130 updates the position coordinate of the mobile navigation device 100 according to the satellite navigation signal. In order to operate conveniently, the position coordinate is stored in the memory 140, so that the processor 130 may access the memory 140 for updating the position coordinate.

In the embodiment of the invention, a maximum time period for which the mobile navigation device has continuously operated in the first mode is limited for power saving. The position coordinate is locked correctly when the mobile navigation device 100 operates in the first mode over a short span; thus no additional power is needed for operation of the satellite positioning module 110. Therefore, in step 309, the processor 130 determines whether a first time span t1 when the mobile navigation device continuously operates in the first mode exceeds a first threshold time span $t_{th1}$.

When the first time span t1 exceeds the first threshold time span $t_{th1}$, step 311 is performed and then the processor 130 performs a mode switching procedure to switch the mobile navigation device 100 to the second mode. Oppositely, when the first time span t1 does not exceed the first threshold time span $t_{th1}$, step 303 is performed, and then the processor 130 continues to update the position coordinate of the mobile navigation device 100 according to the satellite navigation signal received by the satellite positioning module 110.

Step 311 further describes the necessary processes illustrating the mobile navigation device 100 entering into the second mode from the first mode. First, the dead reckoning module 120 is activated to detect the displacement and the rotation of the mobile navigation device 100. The satellite positioning module 110 is disabled after the dead reckoning module 120 is successfully activated, so as to save power for the mobile navigation device 100. Detailed description of the embodiments illustrating the mobile navigation device 100 entering the second mode will be described below.

Figure 4:
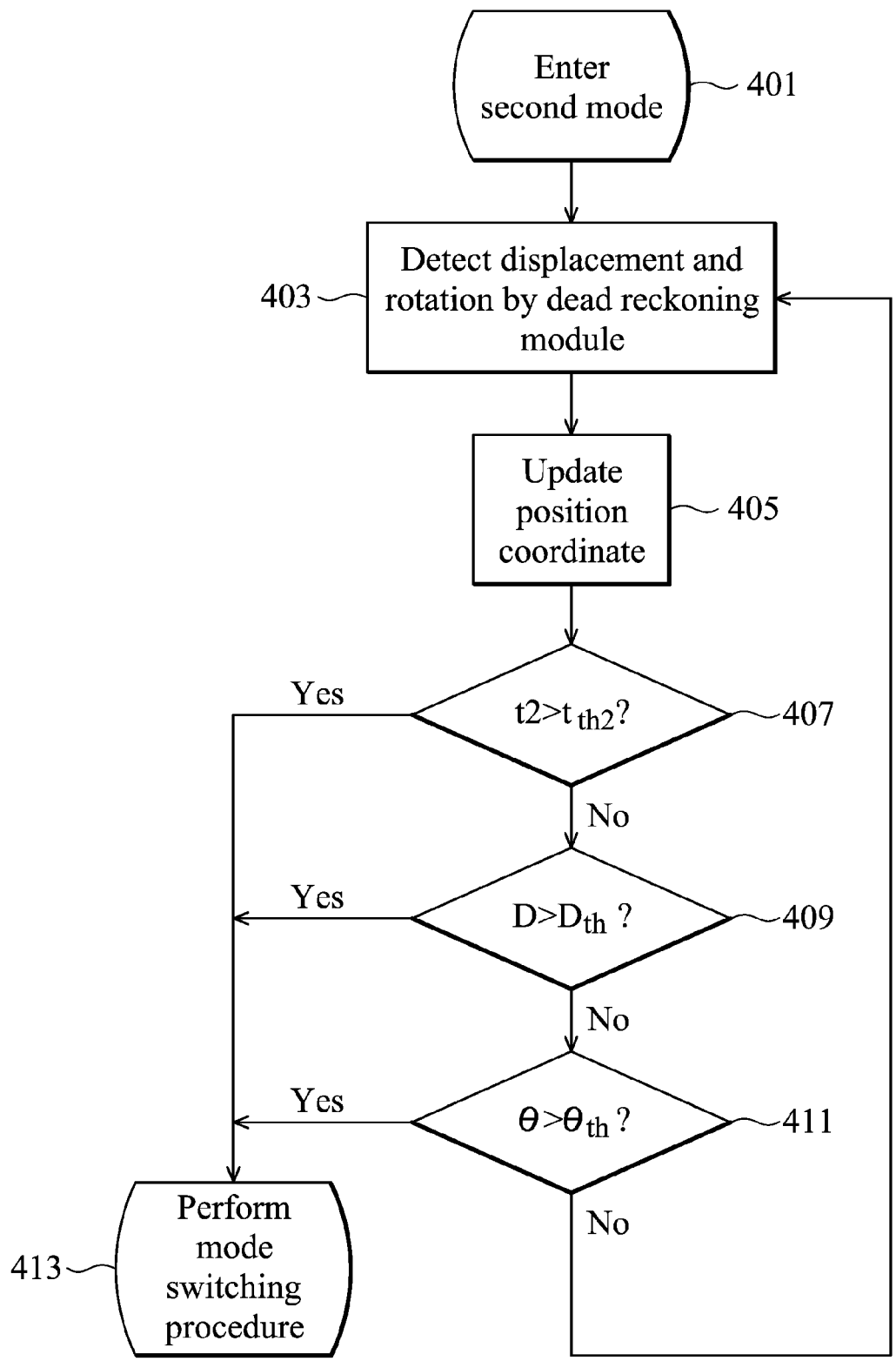
FIG. 4 shows a flowchart illustrating the mobile navigation device of the embodiment of the invention operating in a DR mode.

FIG. 4 shows a flowchart illustrating the mobile navigation device 100 of the embodiment of the invention operating in a DR mode (the second mode). FIG. 4 describes that the mobile navigation device 100 is switched back to the first mode from the second mode when meeting some specific conditions, such as a sustained time, a motion distance or a varied traveling direction of the mobile navigation device 100. In step 401, the mobile navigation device 100 enters the second mode. In the meantime, the satellite positioning module 110 is disabled and the dead reckoning module 120 is activated. In step 403, the dead reckoning module 120 detects the displacement and the rotation of the mobile navigation device 100. In step 405, the processor 130 updates the position coordinate of the mobile navigation device 100 according to the displacement and the rotation.

If the mobile navigation device 100 takes a long period of time to operate in the second mode, detection distortion generated by the dead reckoning module 120 will magnify. In addition, if the satellite positioning module 110 is disabled for a long period of time, such as exceeding 4 hours, the information regarding the ephemeris stored in the memory 140 would be insignificant, and then a long period of time would be needed to perform a re-orientation procedure. Therefore, in order to avoid decreasing orientation efficiency of the mobile navigation device 100, a maximum time period for which the mobile navigation device 100 can continuously operate in the second mode is limited. In step 407, the processor 130 determines whether a second time span t2 when the mobile navigation device continuously operates in the second mode exceeds a second threshold time span $t_{th2}$. If the second time span t2 exceeds the second threshold time span $t_{th2}$, step 413 is preformed, wherein a mode switching procedure is performed, such that the mobile navigation device 100 is switched back to the first mode through advanced preparations. On the contrary, if the second time span t2 does not exceed the second threshold time span $t_{th2}$, the mobile navigation device 100 continues to operate in the second mode.

When the satellite positioning module 110 is disabled, the detection distortion of the dead reckoning module 120 may increase if the motion distance exceeds 2 kilometers. Therefore, a maximum motion distance for which the mobile navigation device has continuously operated in when in the second mode is limited. For example, in step 401, the processor 130 may record the current position coordinate of the mobile navigation device 100 as a first location. In step 409, as shown in FIG. 4, the processor 130 determines whether the displacement D detected by the dead reckoning module 120 exceeds a threshold distance $D_{th}$, wherein the displacement D is a linear distance or an accumulative trace length reckoned from the first location. If the displacement D exceeds the threshold distance $D_{th}$, the mode switching procedure in step 413 is preformed and the mobile navigation device 100 is switched to the first mode following advanced preparations. On the contrary, if the displacement D does not exceed the threshold distance $D_{th}$, the processor 130 updates the position coordinate according to the first location, the displacement and the rotation and keeps the mobile navigation device 100 in the second mode.

Furthermore, the rotation of the mobile navigation device 100 generated in the second mode is also a factor which is used to determine whether the mobile navigation device 100 needs to be switched back to the first mode. In step 401, the processor 130 may record a current traveling direction of the mobile navigation device 100 as a first direction. The dead reckoning module 120 is capable of detecting the rotation. In the embodiment, the rotation may have various definitions that all may be used as the bases for determination. For example, the rotation may be an included angle between the current traveling direction of the mobile navigation device 100 and the first direction, or the rotation may be an included angle between the first direction and a connecting line direction formed by the first location and the current position coordinate of the mobile navigation device 100. Moreover, the rotation may be a varied traveling direction of the mobile navigation device 100 during a specific unit of time, such as once every 5 seconds. The values can be used to determine whether motion of the mobile navigation device 100 is circuitous and rough. In general, the dead reckoning module 120 has accurate determination for linear motions, but may have larger distortions for veer around motions. Therefore, in step 411, the processor 130 determines whether the rotation θ exceeds a threshold angle $θ_{th}$. If the rotation θ exceeds the threshold angle $θ_{th}$, the mode switching procedure in step 413 is performed. On the contrary, if the rotation θ does not exceed the threshold angle $θ_{th}$, the mobile navigation device 100 continues to operate in the second mode (back to step 403).

Figure 5:
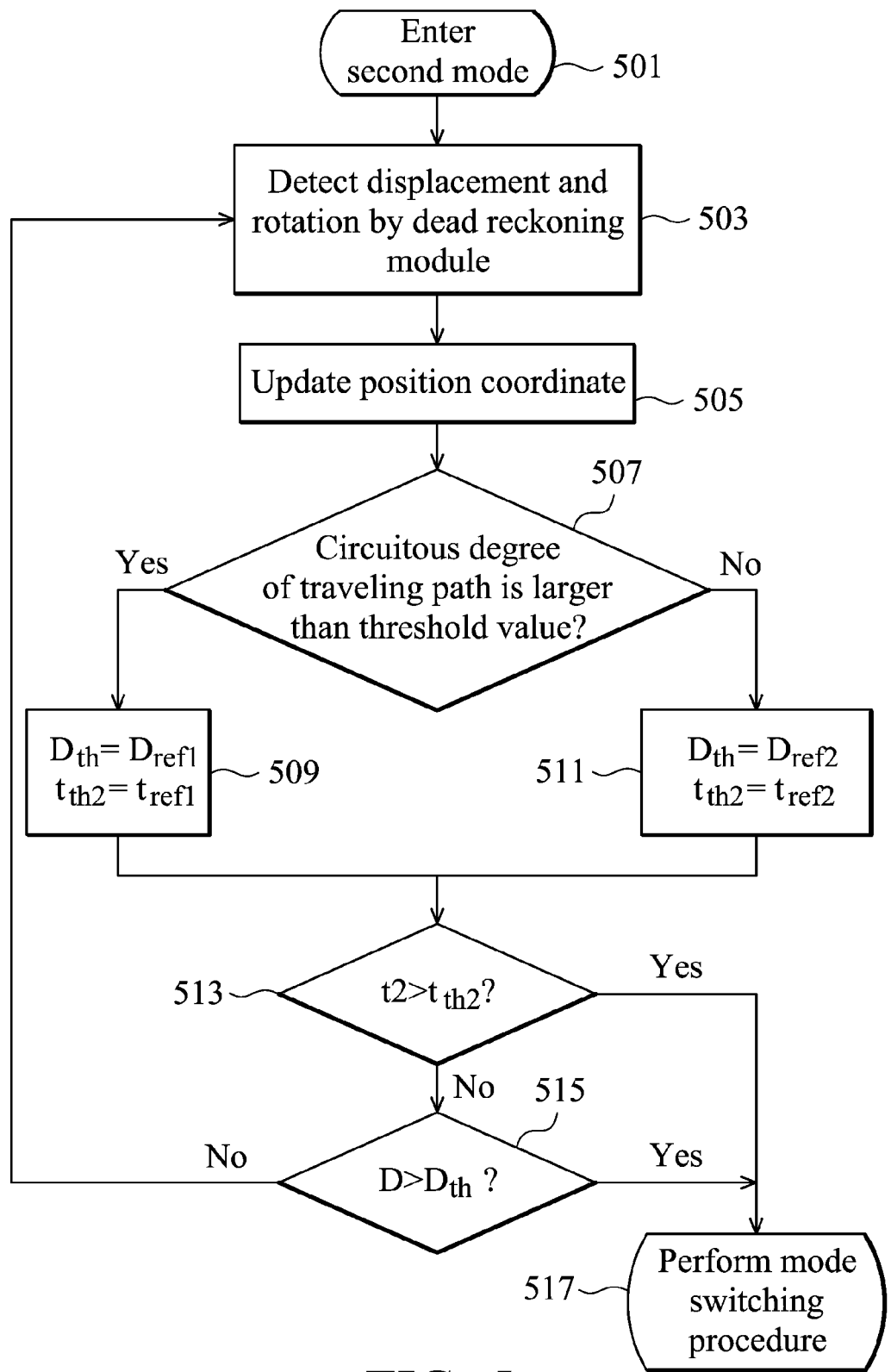
FIG. 5 shows a flowchart of a DR mode according to another embodiment of the invention.

FIG. 5 shows a flowchart of a DR mode according to another embodiment of the invention. In the embodiment, circuitous degree of the traveling path detected by the dead reckoning module 120 may have an effect on the detection threshold values. As described above, a lot of circuitous traveling paths will increase distortions. Thus, a lower threshold is desired when the mobile navigation device 100 backs to the first mode. Comparatively, if the traveling path of the mobile navigation device 100 is more linear, effects on distortions is less. Thus, the mobile navigation device 100 may operate in the second mode for a long period of time and have longer motion distance.

Specifically, in step 501, the mobile navigation device 100 enters the second mode. In the meantime, the satellite positioning module 110 is disabled while the dead reckoning module 120 is activated. In step 503, the dead reckoning module 120 detects the displacement and the rotation of the mobile navigation device 100. In step 505, the processor 130 updates the position coordinate of the mobile navigation device 100 according to the displacement and the rotation. In step 507, the circuitous degree of the traveling path of the mobile navigation device 100 is obtained by the processor 130 according to the displacement and the rotation provided by the dead reckoning module 120. Statistic principles may be used to obtain the circuitous degree, such as a mean value, a variances or root mean square (RMS) functions, and a value indicating the circuitous degree (also-called as a circuitous index) is also obtained by converting a instantaneous angular velocity, an average angular velocity and the rotation. Statistical methods capable of describing a curved and straight path, and detailed algorithms thereof will not be described herein. For example, the circuitous degree is increased when the circuitous index is increased, and the traveling path will approach a straight line when the circuitous index is decreased.

In step 507, if the circuitous index is larger than a threshold value, step 509 is preformed, and the processor 130 assigns a first distance reference value $D_{ref1}$ as the threshold distance $D_{th}$ and assigns a first time reference value $t_{ref1}$ as the second threshold time span $t_{th2}$. On the contrary, if the circuitous index is smaller than the threshold value, the step 511 is performed, and the processor 130 assigns a second distance reference value $D_{ref2}$ as the threshold distance $D_{th}$ and assigns a second time reference value $t_{ref2}$ as the second threshold time span $t_{th2}$. Specifically, in the embodiment, the first distance reference value $D_{ref1}$ is smaller than the second distance reference value $t_{ref2}$, and the first time reference value $t_{ref1}$ is smaller than the second time reference value $t_{ref2}$.

Next, step 513 and step 535 use the threshold values obtained in the step above to perform the determinations that are identical to step 407 and step 409. In step 513, the processor 130 determines whether the second time span t2 when the mobile navigation device continuously operates in the second mode exceeds the second threshold time span $t_{th2}$. If the second time span t2 exceeds the second threshold time span $t_{th2}$, step 517 is performed, to perform a mode switching procedure such that the mobile navigation device 100 is switched back to the first mode through advanced preparations. On the contrary, if the second time span t2 does not exceed the second threshold time span $t_{th2}$, step 515 is performed.

In step 515, the processor 130 further determines whether the displacement D detected by the dead reckoning module 120 exceeds the threshold distance $D_{th}$ determined in step 509 or step 511. If the displacement D exceeds the threshold distance $D_{th}$, the mode switching procedure in step 517 is performed, and the mobile navigation device 100 is switched to the first mode following advanced preparations. On the contrary, if the displacement D does not exceed the threshold distance $D_{th}$, the processor 130 updates the position coordinate according to the first location, the displacement and the rotation and keeps the mobile navigation device 100 in the second mode (step 503).

Figure 6:
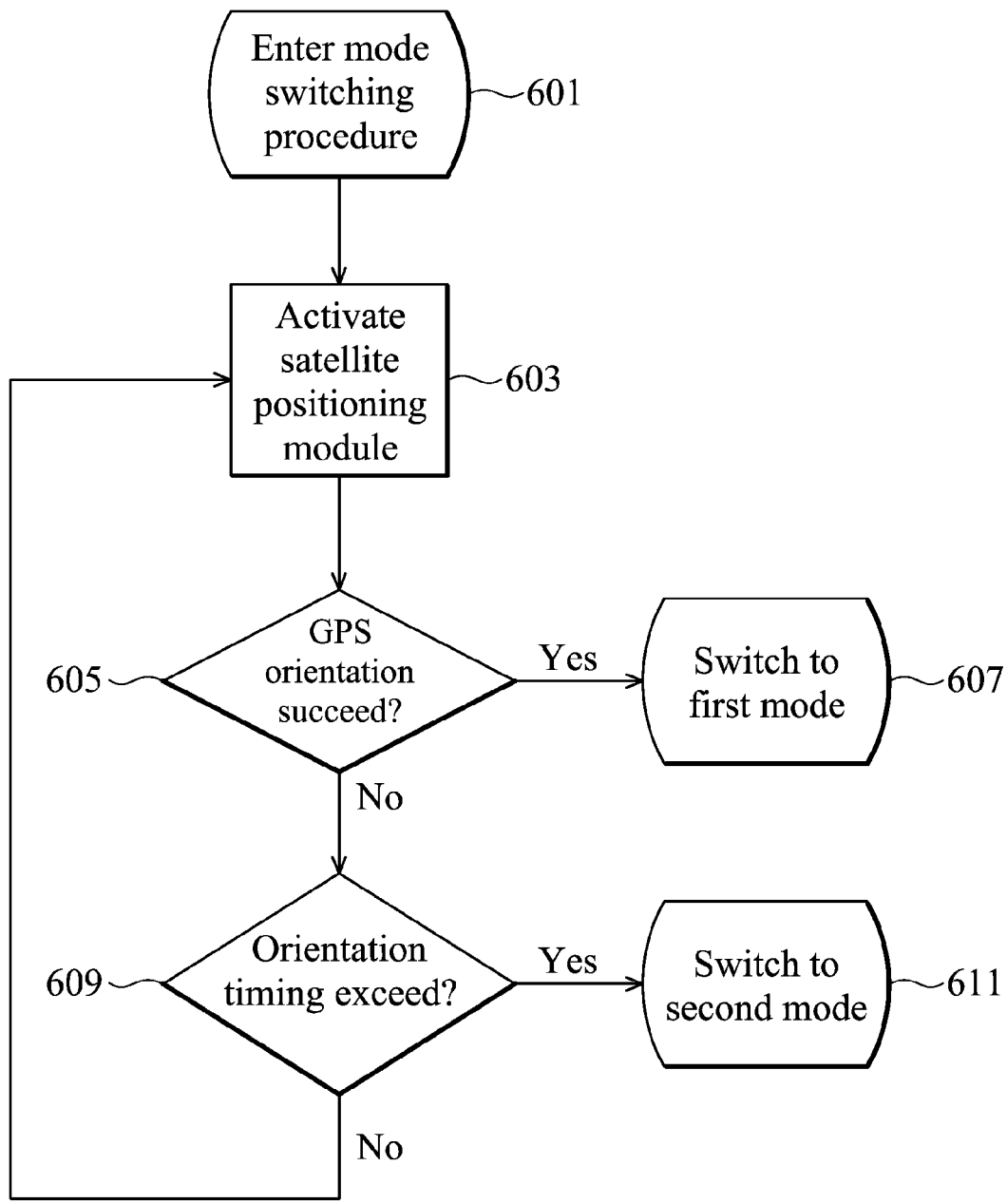
FIG. 6 shows a flowchart illustrating a mode switching procedure according to an embodiment of the invention.

FIG. 6 shows a flowchart illustrating a mode switching procedure according to an embodiment of the invention. Step 413 of FIG. 4 is the same as step 517 of FIG. 5, wherein the mobile navigation device 100 is switched from the second mode to the first mode. Due to unknown environment conditions, despite the mobile navigation device 100 receiving the satellite navigation signal, switching of the mobile navigation device 100 from the second mode to the first mode may be a rash decision. For example, the dead reckoning module 120 may be disabled and accordingly, the satellite positioning module 110 would not be capable of performing the orientation procedure in an indoor environment. Thus, making it impossible to track the position coordinate of the mobile navigation device 100. In step 601, a mode switching procedure is performed. First, in step 603, the satellite positioning module 110 is activated to start tracking of and locking into the satellite navigation signal. At this time, the dead reckoning module 120 is still activated to detect the displacement and the rotation. In step 605, it is determined whether orientation is successful for the satellite positioning module 110. If yes, step 607 is performed, and the dead reckoning module 120 is disabled, so that the mobile navigation device 100 may enter the first mode. Otherwise, step 609 is performed, and it is checked whether a consumption time $t_{track}$, that starts to count when the satellite positioning module 110 is activated, exceeds a limit time $t_{lim}$. If yes, step 611 is performed, and the satellite positioning module 110 is disabled, so that the mobile navigation device 100 may be switched back to the second mode and continues performing the orientation procedure through the dead reckoning module 120. On the contrary, if the consumption time $t_{track}$ does not exceed the limit time $t_{lim}$, step 603 is performed again, and the satellite positioning module 110 continues to track and lock onto satellite navigation signals.

Figure 7:
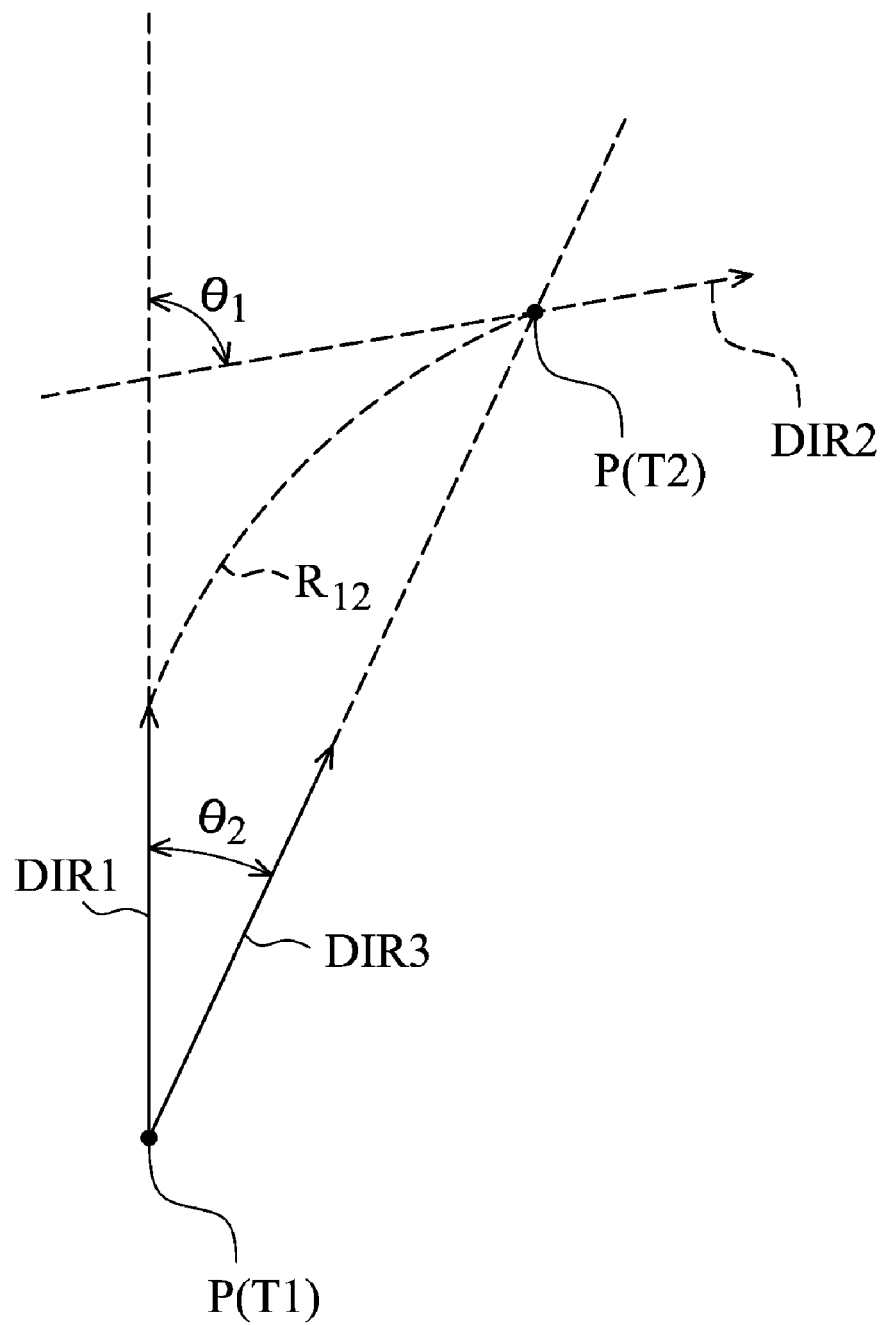
FIG. 7 shows a schematic illustrating the rotation according to an embodiment of the invention.

FIG. 7 shows a schematic illustrating the rotation according to an embodiment of the invention. The dead reckoning module 120 substantially detects the displacement and the rotation by sampling the related data every specific unit of time. P(T1) represents a first location of the satellite positioning module 110 at first time point T1. P(T2) represents a second location of the satellite positioning module 110 at second time point T2. $R_{12}$ represents a traveling path from P(T1) to P(T2), and it is a curve in the embodiment. DIR1 represents a traveling direction of the mobile navigation device 100 at P(T1), and DIR2 represents a traveling direction of the mobile navigation device 100 at P(T2). DIR3 represents a direction from P(T1) to P(T2). When the mobile navigation device 100 is moved from the first location to the second location, the rotation detected by the dead reckoning module 120 may be taken as an included angle $\theta_1$ between DIR1 and DIR2, an included angle $\theta_2$ between DIR1 and DIR3 or a curvature of path $R_{12}$. The average angular velocity can be obtained by dividing the included angle $\theta_1$ into (T2−T1). If (T2−T1) is close to zero, the instantaneous angular velocity can be obtained. Therefore, the rotation detected by the dead reckoning module 120 has various applications, wherein the circuitous degree of the traveling path is determined according to the statistics of information. The embodiments of the invention may suitably use the rotation according to the conception described above.

Figure 8:
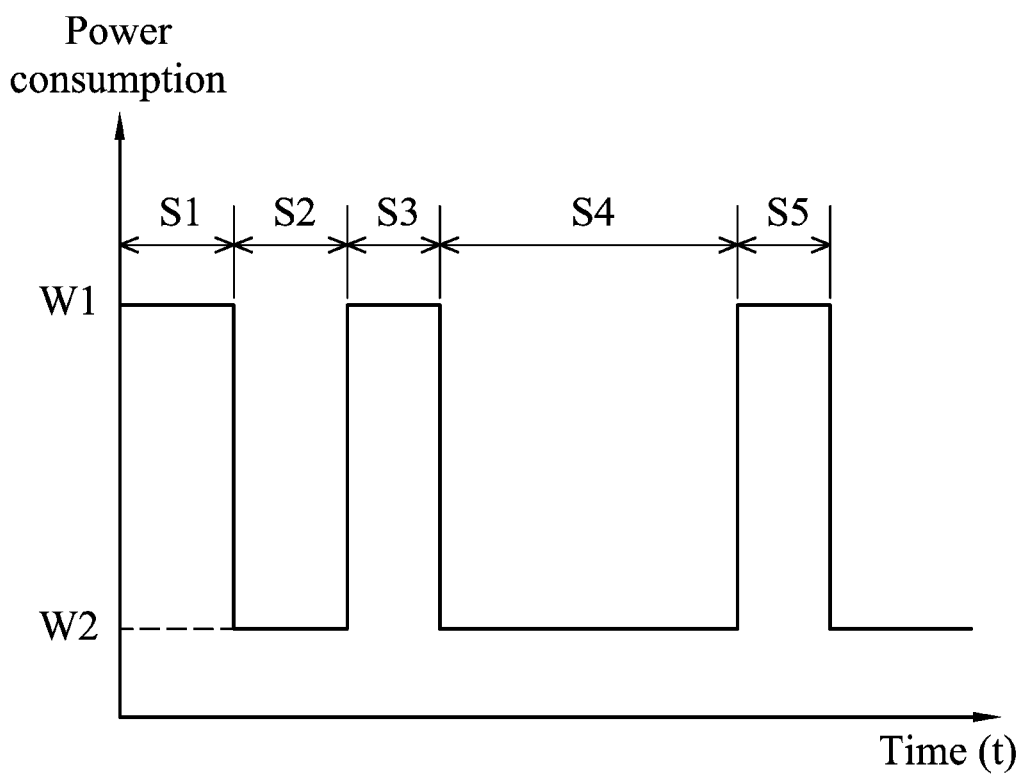
FIG. 8 shows a diagram illustrating variation in power consumption in the mobile navigation device according to an embodiment of the invention.

FIG. 8 shows a diagram illustrating variation in power consumption in the mobile navigation device 100 according to an embodiment of the invention. In FIG. 8, W1 represents a power consumption value of the first mode, and W2 represents a power consumption value of the second mode. The mobile navigation device 100 operates in the first mode and the second mode, alternately. Sections S1, S3 and S5 correspond to the first mode, wherein time duration of each section is substantially the same when the receiving GPS signal is normal. Sections S2 and S4 correspond to the second mode, wherein time duration of each section is dependant upon road conditions. For example, the mobile navigation device 100 may go through a circuitous path during section S2, and the mobile navigation device 100 may go through a straight line path during section S4. Thus, the time duration of section S4 is longer than that of section S2. In other words, if the road status is close to a straight line, power saving of the mobile navigation device 100 of the embodiments will increase.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile navigation device, comprising:
a satellite positioning module, for receiving a satellite navigation signal;
a dead reckoning module, for detecting a displacement and a rotation of the mobile navigation device;
a processor coupled to the satellite positioning module and the dead reckoning module, for reading the satellite navigation signal, the displacement, and the rotation, wherein the mobile navigation device operates in a first mode and a second mode alternately, and
in the first mode, the satellite positioning module is activated, the dead reckoning module is disabled, and the processor calculates a position coordinate according to the satellite navigation signal, and
in the second mode, the satellite positioning module is disabled, the dead reckoning module is activated, and the processor updates the position coordinate according to the displacement and the rotation; and
a memory coupled to the processor, for storing the position coordinate,
wherein when the mobile navigation device is switched from the first mode to the second mode, the memory keeps the data status of the satellite positioning module for a next switch back to the first mode from the second mode,
wherein in the first mode:
the processor determines whether a first time span when the mobile navigation device continuously operates in the first mode exceeds a first threshold time span,
the mobile navigation device is switched to the second mode by the processor when the first time span exceeds the first threshold time span, and the processor continues to update the position coordinate according to the satellite navigation signal when the first time span does not exceed the first threshold time span.

2. The mobile navigation device as claimed in claim 1, further comprising:
a firmware coupled to the processor, for providing a program to control the timing for switching between the first mode and the second mode for the processor.

3. The mobile navigation device as claimed in claim 1, wherein in the first mode:
the satellite positioning module determines whether the satellite navigation signal satisfies a receiving condition,
wherein the mobile navigation device is switched to the second mode by the processor when the satellite navigation signal does not satisfy the receiving condition.

4. The mobile navigation device as claimed in claim 3, wherein the processor updates the position coordinate according to the satellite navigation signal when the satellite navigation signal satisfies the receiving condition.

5. The mobile navigation device as claimed in claim 1, wherein when the mobile navigation device is switched from the first mode to the second mode:
the dead reckoning module is activated to detect the displacement and the rotation; and
the satellite positioning module is disabled to reduce power consumption of the mobile navigation device.

6. The mobile navigation device as claimed in claim 1, wherein when the mobile navigation device is switched from the second mode to the first mode:
the processor activates the satellite positioning module and keeps the dead reckoning module activated; and
the processor determines whether the satellite navigation signal was locked by the satellite positioning module during a specific time;
wherein the dead reckoning module is disabled while the satellite positioning module is activated by the processor when the satellite navigation signal was locked by the satellite positioning module during the specific time, to switch the mobile navigation device to the first mode, and
the satellite positioning module is disabled while the dead reckoning module is activated by the processor when the satellite navigation signal was not locked by the satellite positioning module during the specific time, to switch the mobile navigation device to the second mode.

7. The mobile navigation device as claimed in claim 1, wherein in the second mode:
the processor determines whether a second time span when the mobile navigation device continuously operates in the second mode exceeds a second threshold time span;
the mobile navigation device is switched to the first mode by the processor when the second time span exceeds the second threshold time span, and
the processor continues to update the position coordinate according to the displacement and the rotation when the second time span does not exceed the second threshold time span.

8. The mobile navigation device as claimed in claim 7, wherein the processor records a current position coordinate of the mobile navigation device as a first location when the mobile navigation device enters the second mode from the first mode.

9. The mobile navigation device as claimed in claim 8, wherein in the second mode:
the processor determines whether the displacement exceeds a threshold distance, wherein the displacement is reckoned from the first location;
the mobile navigation device is switched to the first mode by the processor when the displacement exceeds the threshold distance, and
the processor updates the position coordinate according to the first location, the displacement, and the rotation and keeps the mobile navigation device in the second mode when the displacement does not exceed the threshold distance.

10. The mobile navigation device as claimed in claim 1, wherein the processor records a current traveling direction of the mobile navigation device as a first direction when the mobile navigation device enters the second mode from the first mode.

11. The mobile navigation device as claimed in claim 10, wherein in the second mode:
the processor determines whether the rotation exceeds a threshold angle;
the mobile navigation device is switched to the first mode by the processor when the rotation exceeds the threshold angle, and
the processor updates the position coordinate according to the first location, the displacement, and the rotation and keeps the mobile navigation device operating in the second mode when the rotation does not exceed the threshold angle.

12. The mobile navigation device as claimed in claim 11, wherein the rotation is an included angle between a current traveling direction of the mobile navigation device and the first direction.

13. The mobile navigation device as claimed in claim 11, wherein the rotation is an included angle between the first direction and a connecting line direction formed by the first location and a current position coordinate of the mobile navigation device.

14. The mobile navigation device as claimed in claim 11, wherein the rotation is a varied traveling direction of the mobile navigation device during a specific unit of time.

15. The mobile navigation device as claimed in claim 9, wherein in the second mode:
the dead reckoning module determines a circuitous index of motion path of the mobile navigation device according to an instantaneous angular velocity, an average angular velocity, and the rotation;
the processor uses a first distance reference value as the threshold distance and uses a first time reference value as the second threshold time span when the circuitous index is larger than a threshold value; and
the processor uses a second distance reference value as the threshold distance and uses a second time reference value as the second threshold time span when the circuitous index is smaller than the threshold value,
wherein the first distance reference value is smaller than the second distance reference value, and the first time reference value is smaller than the second time reference value.

16. The mobile navigation device as claimed in claim 1, wherein the dead reckoning module comprises a gyro or an acceleration sensor.

* * * * *